United States Patent
Stewart

(10) Patent No.: US 8,612,961 B2
(45) Date of Patent: Dec. 17, 2013

(54) SYSTEM AND METHOD FOR DOWNLOADING SOFTWARE UPGRADES

(75) Inventor: Elliot M. Stewart, Buffalo Grove, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1082 days.

(21) Appl. No.: 12/346,971

(22) Filed: Dec. 31, 2008

(65) Prior Publication Data

US 2010/0169875 A1 Jul. 1, 2010

(51) Int. Cl.
*G06F 9/44* (2006.01)

(52) U.S. Cl.
USPC ........... 717/168; 717/169; 717/174; 717/175; 717/178

(58) Field of Classification Search
USPC .................................................. 717/168–178
See application file for complete search history.

(56) References Cited

U.S. PATENT DOCUMENTS

| | | | |
|---|---|---|---|
| 6,542,906 B2 * | 4/2003 | Korn | 707/641 |
| 6,912,591 B2 * | 6/2005 | Lash | 709/246 |
| 6,996,818 B2 | 2/2006 | Jacobi et al. | |
| 7,069,311 B2 * | 6/2006 | Gupta et al. | 709/219 |
| 7,096,311 B2 * | 8/2006 | Chiang | 711/100 |
| 7,350,205 B2 * | 3/2008 | Ji | 717/172 |
| 7,529,779 B2 * | 5/2009 | Herle et al. | 1/1 |
| 2005/0254521 A1 * | 11/2005 | Peng | 370/472 |
| 2006/0130046 A1 * | 6/2006 | O'Neill | 717/168 |
| 2007/0250497 A1 * | 10/2007 | Mansfield et al. | 707/5 |

* cited by examiner

*Primary Examiner* — Anna Deng
*Assistant Examiner* — Brahim Bourzik

(57) ABSTRACT

A method of upgrading a first software file stored at a wireless communication device so that the wireless communication device is provided with a second software file that is an upgraded version of the first software file, and also a wireless communication device and system, are disclosed. In at least one embodiment, the method includes receiving a software upgrade file, where the software upgrade file includes second-order difference information. The method also includes storing the upgrade file in a memory portion associated with the wireless communication device, and generating the second software file based upon the upgrade file, the first software file, and additional information. The additional information includes at least one of a pattern file representative of assumed differences between the first and second software files and at least some first-order difference information representative of at least some actual differences between the first and second software files.

18 Claims, 8 Drawing Sheets

SYSTEM AND METHOD FOR DOWNLOADING SOFTWARE UPGRADES

FIELD OF THE INVENTION

The present invention relates to software upgrade systems and, more particularly, to software upgrade systems involving wireless communication devices.

BACKGROUND OF THE INVENTION

Wireless communication devices such as cellular telephones, pagers, personal digital assistants, and other handheld devices, are ubiquitous in the modern world. Frequently, such wireless communication devices are loaded with a plurality of software files including, for example, software application files for implementing a variety of software applications, such as, electronic mail (or email), web browsers, wallpaper settings, screensavers, ring tones, etc., as well as various dynamic link library (DLL) files, shared object files, firmware files, system configuration files, and other types of files required for the proper functioning of the wireless communication device. Occasionally, one or more of the aforementioned software files may need to be upgraded or revised for various reasons, for example, to correct software bugs that corrupt portions of those files (or even the entire files) and/or to adapt the files for use with evolving technologies. Software upgrades to files may also be required to install new software applications and/or to add new features to the wireless communication devices.

Several techniques of providing such software upgrades to wireless communication device have conventionally been used. One such technique is shown in FIGS. 1 and 2A-2C (Prior Art). FIG. 1 in particular shows a conventional software upgrade system 100 that employs a differencing component 102 in communication with an update component 104 of a wireless communication device (not shown) via a communication link 106. The differencing component 102 in particular includes a computer system 108 having an update package (UP) generator 110 that receives and determines differences between a first file (Software Version A) 112 and a second file (Software Version B) 114 to generate an update package file or simply update package 116 (represented as [UP A→B]) reflecting those differences. The communication link 106 can be representative of any one or more communication links and/or communication mechanisms allowing for communication between the differencing component 102 and the update component 104/wireless communication device (e.g., a digital wireless communication signal communicated electromagnetically), which are typically located apart from or remotely from one another.

With respect to the first and the second files 112 and 114, respectively, as well as the update package 116, each of these is a software file, exemplary details of which are shown in FIGS. 2A-C. Particularly, as shown in FIG. 2A, the first file 112 is an old or original version (e.g., Version A) of a software file while, as shown in FIG. 2B, the second file 114 is a new and revised version (e.g., Version B) of the first file, which includes one or more software upgrades in order to correct software bugs, update pre-existing software characteristic, and/or to add new features. As further shown in FIG. 2A, the first file 112 can include a plurality of software applications, for example, an e-mail application 200, a calendar application 202, a web browser application 204, as well as a cellular call processing stack 206, user interface services software 208, digital signaling processor software 209, a language pack 210, etc. Each of the aforementioned software applications 200-210 is composed of a series of computer instructions or software code. FIG. 2A in particular illustrates an exemplary software code portion 212 suitable for governing operation of a software application XYZ (which is intended to be representative of any of the applications 200-210).

FIG. 2B by comparison illustrates how, in at least the present exemplary embodiment, the second file 114 includes much of the same, but additionally some new, software portions relative to the first file 112. More particularly as shown, the second file 114 carries over the software applications 200-210 from the first file 112 without any revisions thereto, as well as adds instant messaging client software 214. Further, by comparison with the software code 212 of the first file 112, the second file 114 is shown to incorporate exemplary software code upgrades 216 and 218. The differences between the first and the second files 112 and 114, respectively, are identified specifically in a third file 220 shown in FIG. 2C, which is an example of the update package 116 of FIG. 1. As shown, the third file 220 in particular includes the instant messaging client software 214, as well as the software code upgrades 216 and 218 of FIG. 2B, all of which were added as upgrades to the second file 114.

Turning back to FIG. 1, upon generating the update package 116, it is delivered via the communication link 106 to the update component 104. The update component 104 is a component within the wireless communication device that receives the update package 116 and is capable of regenerating the second file 114 (that is, generating a copy of the second file 114 existing at the differencing component 102) from the update package 116 assuming that the update component 104 already has in its possession the first file 112. Upon regenerating the second file 114, the update component 104 then additionally installs that file onto the wireless communication device. In the present embodiment, the update component 104 includes a memory component 118 (e.g., Read Only Memory (ROM)) that is divided into several regions, namely, a file system region 120 where various software applications are stored, a software region 122 where a copy of one file (e.g., the first file 112) is installed prior to upgrading and another file (e.g., the second file 114) that replaces the one file upon completion of upgrading, a reserved ROM region 124, and an update agent (UA) region 126, which implements an update agent software program to perform updating (e.g., updating of the first file with the second file).

FIG. 1 in particular shows the same update component 104/memory component 118 three times to illustrate schematically how the contents stored within the memory component evolve over three steps of the updating operation. During the updating operation, the update package 116 first is delivered through the communication link 106 into the memory 118 as shown in a first step 128 and, upon being received, is then downloaded (as shown by an arrow 130) into the reserved ROM region 124 of the memory, as shown in a second step 132. Also as shown, during steps 128 and 132, the software region 122 stores the first (non-updated) file 112. Next, at a third step 134, the update agent provided by the UA region 126 operates upon the update file represented by the update package 116 (as shown by an arrow 136) to generate the second file 114 based upon the first file 112 stored within the software region 122. The second file 114 is then stored and replaces the first file 112 within the software region 122 (as shown by an arrow 138).

In this manner, therefore, software (including firmware) upgrades can be delivered and installed within the wireless communication device by first determining the differences between the old and the revised software files (e.g., the first and second files 112 and 114, respectively), transmitting the differences to the wireless communication device, and using those differences to generate a copy of the revised software file (e.g., the second file 114) within the wireless communication device.

Although adequate in some respects, such conventional techniques of upgrading software files within a wireless communication device are nevertheless inadequate in at least certain respects. For example, when the size of the update package is large, delivery of the update package to the update component of the wireless communication device can be slow, and also the processing time (e.g., update time) within the wireless communication device can be long, thereby affecting device performance. Large update packages also necessitate large capacity at the reserved ROM region. In addition, in cases when the update package exceeds the size of the reserved ROM region allocated for storing the update package, delivery of the update package to the update component of the wireless communication device may be partially (or possibly entirely) restricted.

It would therefore be advantageous if an improved system and/or method could be developed for delivering software and/or firmware updates (or upgrades) to wireless communication devices that alleviate at least some of the problems mentioned above.

BRIEF SUMMARY OF THE INVENTION

In at least some embodiments, the present invention relates to a method of upgrading a first software file stored at a wireless communication device so that the wireless communication device is provided with a second software file that is an upgraded version of the first software file. The method includes receiving, via a wireless communication link, a software upgrade file, where the software upgrade file includes second-order difference information. The method further includes storing the received software upgrade file in a first memory portion of at least one memory component associated with the wireless communication device, and generating the second software file based upon the received software upgrade file, the first software file, and additional information. The additional information includes at least one of a pattern file representative of assumed differences between the first and second software files and at least some first-order difference information representative of at least some actual differences between the first and second software files.

Additionally, in at least some embodiments, the present invention relates to a wireless communication device configured to allow for upgrading of a first software file stored thereon with a second software file that is an upgraded version of the first software file. The device includes a wireless receiver, a processing device in communication with the wireless receiver, and a memory device in communication with the processing device. The memory device includes at least first, second and third memory regions, where the first memory region is configured to store the first software file, where the second memory region is configured to store a software upgrade file received wirelessly via the wireless receiver, and where the third memory region is configured to store additional information that includes at least one of a pattern file representative of assumed differences between the first and second software files and at least some first-order difference information representative of at least some actual differences between the first and second software files. The processing device operating in conjunction with the memory device is configured to reconstruct the second software file based upon the first software file, the software upgrade file, and the additional information.

Further, in at least some embodiments, the present invention relates to a wireless communications system configured to allow for upgrading of a first software file with a second software file that is an upgraded version of the first software file achieving software upgrades. The system includes a base station having a differencing component that generates a software upgrade file including second-order difference information representative of differences between first and second intermediate files, where at least one of the intermediate files includes first-order difference information representative of differences between the first and second software files. The system also includes a mobile device in wireless communication with the base station via a wireless communication link, the mobile device including an upgrade component that receives the software upgrade file transmitted wirelessly from the base station and that generates the second software file based upon the received software upgrade file, the first software file and additional information. The additional information includes at least one of a pattern file representative of assumed differences between the first and second software files and at least some of the first-order difference information.

DETAILED DESCRIPTION OF THE PREFERRED EMBODIMENT

Figure 3:
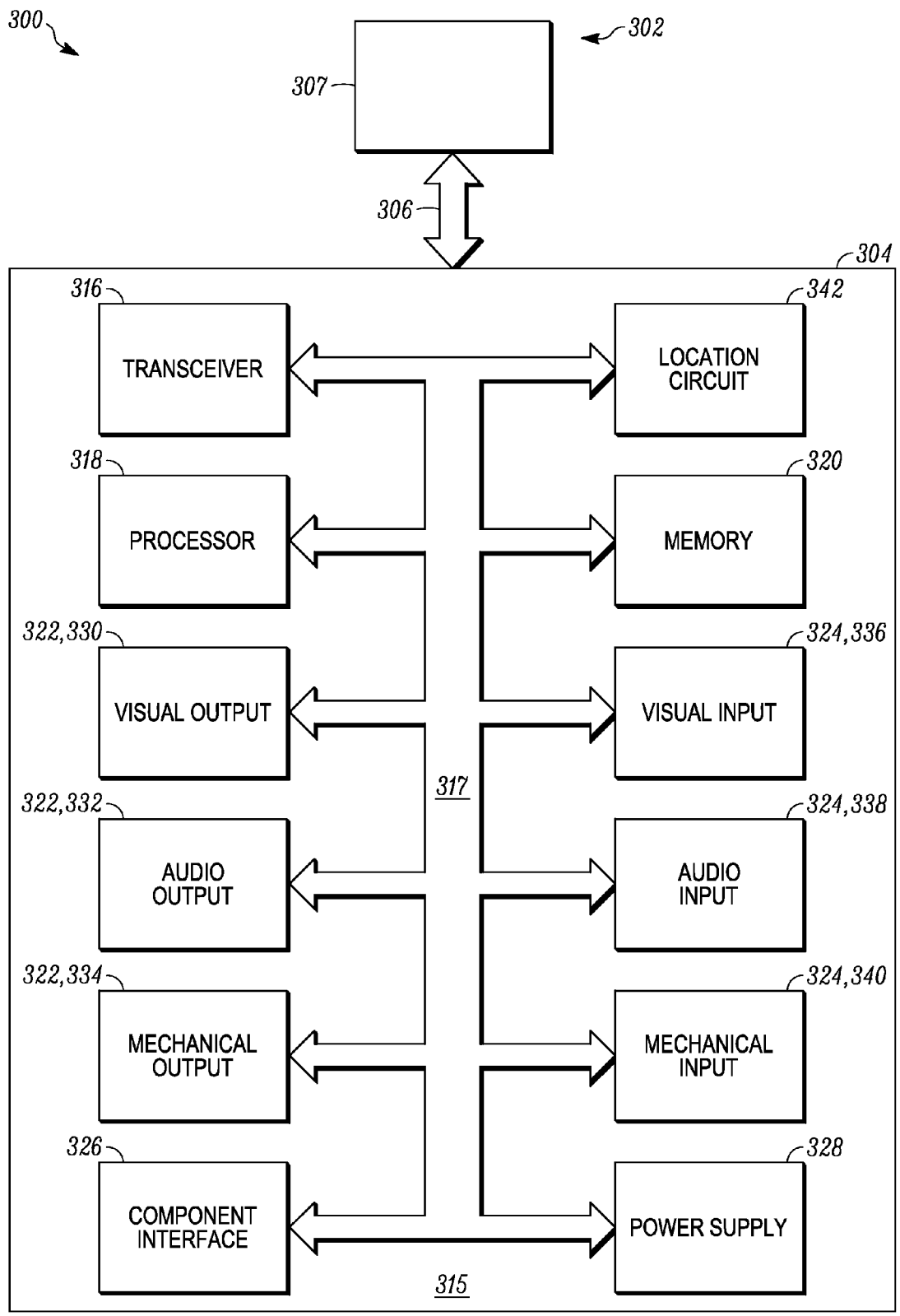
FIG. 3 is a schematic diagram of an exemplary wireless communication system capable of performing software upgrades, in accordance with at least some embodiments of the present invention.

Referring now to FIG. 3, an exemplary wireless communication system 300 is shown, upon which an improved software upgrade system in accordance with at least some embodiments of the invention is implemented, as described in further detail below. As shown, the wireless communication system 300 in the present example includes a base station 302 that is in communication with a wireless communication device 304 by way of a wireless communication link 306. The base station 302 is intended to be representative of any of a variety of different types of devices and systems (e.g., a server computer system and associated wireless transceiver and/or other communications equipment) capable of communicating wirelessly with one or more wireless communication devices such as the wireless communication device 304. As shown, in the present embodiment the base station 302 in particular includes a differencing component 307 that is part of the improved software upgrade system, two embodiments of which are described in further detail with respect to FIGS. 4-5.

The communication link 306, by which communications including communications involving software upgrades occur between the base station 302 and wireless communication device 304, can be any of a wide variety of communication channels, network interfaces, buses and/or a combination of the above. In addition, although presently intended to represent a wireless communication link, the communication link 306 can in other embodiments involve wired communication links, or combinations of wired and wireless communication links. Also, it should be understood that the wireless communications occurring via the communication link 306 can involve any of a variety of technologies, protocols and other format including, for example, the internet and the World Wide Web (WWW), as well as connections involving various local area networks (LANs), metropolitan area networks (MANs), wide area networks (WANs), RS-232 communication links and telephone lines.

With respect to the wireless communication device 304, in at least the present embodiment it is intended to be a mobile device and includes various internal components 315 as shown in block diagram form. Although in the present embodiment the wireless communication device 304 is particularly intended to be representative of a cellular telephone, the wireless communication device can also be other mobile devices depending upon the embodiment, for example, personal digital assistants or other handheld devices, or even personal computers capable of wireless communications, as well as devices operating on various mobile platforms such as GSM, UMTS, CDMA, IDEN and WIMAX. Also, while FIG. 3 shows the internal components 315, it should further be understood that these components are only intended to be exemplary and that other components in addition to (or instead of) those shown, can be present.

In the present exemplary embodiment, internal components 315 of the wireless communication device 304 include multiple components that are capable of intercommunication with one another (either directly or indirectly) by way of an internal network or network(s) 317. Included among the internal components 315 particularly are one or more wireless transceivers 316, a processor 318, a memory portion 320, one or more output devices 322, and one or more input devices 324. Additionally, the internal components 315 include a user interface that comprises one or more output devices 322 and one or more input devices 324. The internal components 315 further include a component interface 326 that provides a direct (e.g., wired) connection to auxiliary components or accessories for additional or enhanced functionality. The internal components 315 also include a power supply 328, such as a battery, for providing power to the other internal components while enabling the wireless communication device 304 to be portable.

Each transceiver 316 can utilize any of a variety of wireless technologies for communicating wirelessly with other devices by media such as that represented by the wireless communication link 306. Upon reception of wireless communication signals, the internal components detect communication signals and the transceiver 316 demodulates the communication signals to recover incoming information, such as voice and/or data, transmitted by the wireless signals. After receiving the incoming information from the transceiver 316, the processor 318 formats the incoming information so that it is capable of being output at one or more of the output device(s) 322. Likewise, for transmission of wireless signals, the processor 318 formats outgoing information, which may or may not be activated by the input devices 324, and conveys the outgoing information to the transceiver 316 for modulation into wireless communication signals.

The input and output devices 322, 324 of the internal components 315 can include a variety of visual, audio and/or mechanical outputs. For example, the output device(s) 322 can include a visual output device 330 such as a liquid crystal display and light emitting diode indicator, an audio output device 332 such as a speaker, alarm and/or buzzer, and/or a mechanical output device 334 such as a vibrating mechanism. Likewise, by example, the input devices 324 can include a visual input device 336 such as an optical sensor (for example, a camera), an audio input device 338 such as a microphone, and a mechanical input device 340 such as a flip sensor, keyboard, keypad, selection button, touch pad, touch screen, capacitive sensor, motion sensor, and switch. In alternate embodiments, more than one of each of or some of (or one of) these various types of output devices 322 and input devices 342 are present or absent.

The internal components 315 of the wireless communication device 304 in the present embodiment include a location circuit 342. The location circuit 342 can include, for example, a Global Positioning System (GPS) receiver, a triangulation receiver, an accelerometer, a gyroscope, or any other information collecting device that are capable of identifying a current location of the device. Operation of the wireless communication device 304 or one or more of the internal components 315 therein can also depend upon the location of the wireless communication device as determined via the location circuit 342 or otherwise based upon movements of the wireless communication device. For example, actions that can actuate one or more input devices 324 can include opening the wireless communication device, unlocking the device, moving the device to actuate a motion, moving the device to actuate a location positioning system, and operating the device in other manners.

The memory portion 320 of the internal components 315 can include any number of a variety of different types of memory devices such as random access memory (RAM) devices, read only memory (ROM) devices, optical memory devices, subscriber identity module memory devices, or any of a variety of other types of memory devices that can be used by the processor 318 to store and retrieve information. The information that can be stored by the memory portion 320 can include a variety of different types of software and software files, and particularly can include software files that can be (and/or may need to be) upgraded from time to time. For example, the software files can include software application files for implementing a variety of software applications, such as, electronic mail (or email), web browsers, wallpaper settings, screensavers, ring tones, etc., as well as various dynamic link library (DLL) files, shared object files, firmware files, system configuration files, file system services, and services related to the handling of protected and unprotected data stored in the memory portion, and other types of files required for the proper functioning of the wireless communication device.

Also, the information that can be stored by the memory portion 320 can include software files related not only to software applications but also to operating systems. Each operating system can be understood as including executable code that controls basic functions of the communication device, such as interaction among the components of the internal components 315, communication with external devices via the transceiver 316 and/or the component interface 326, and storage and retrieval of applications and data to and from the memory portion 320. This is in contrast to applications, which can be understood as including executable code that utilizes an operating system to provide more specific functionality for the communication devices. Further, the memory portion 320 can be understood as storing data other than software files, that is, data that is non-executable code or information that may be referenced and/or manipulated by an operating system or application in performing any of a variety of functions or calculations.

In accordance with at least some embodiments of the present invention, the memory portion 320 in particular stores software files that can be (and/or occasionally may need to be) upgraded. Such upgradeable software files can include, among other things, any of the software files mentioned above (e.g., software application files or operating system files, including firmware files being upgraded as firmware over the air (FOTA) updates), although the present invention is intended broadly encompass software upgrade systems capable of upgrading other types of software files as well. As will be described below, in the present embodiment the memory portion 320 in particular is configured to include several memory regions that are respectively employed to store various types of data at various times before, during and after upgrading of a software file or files.

Figure 4:
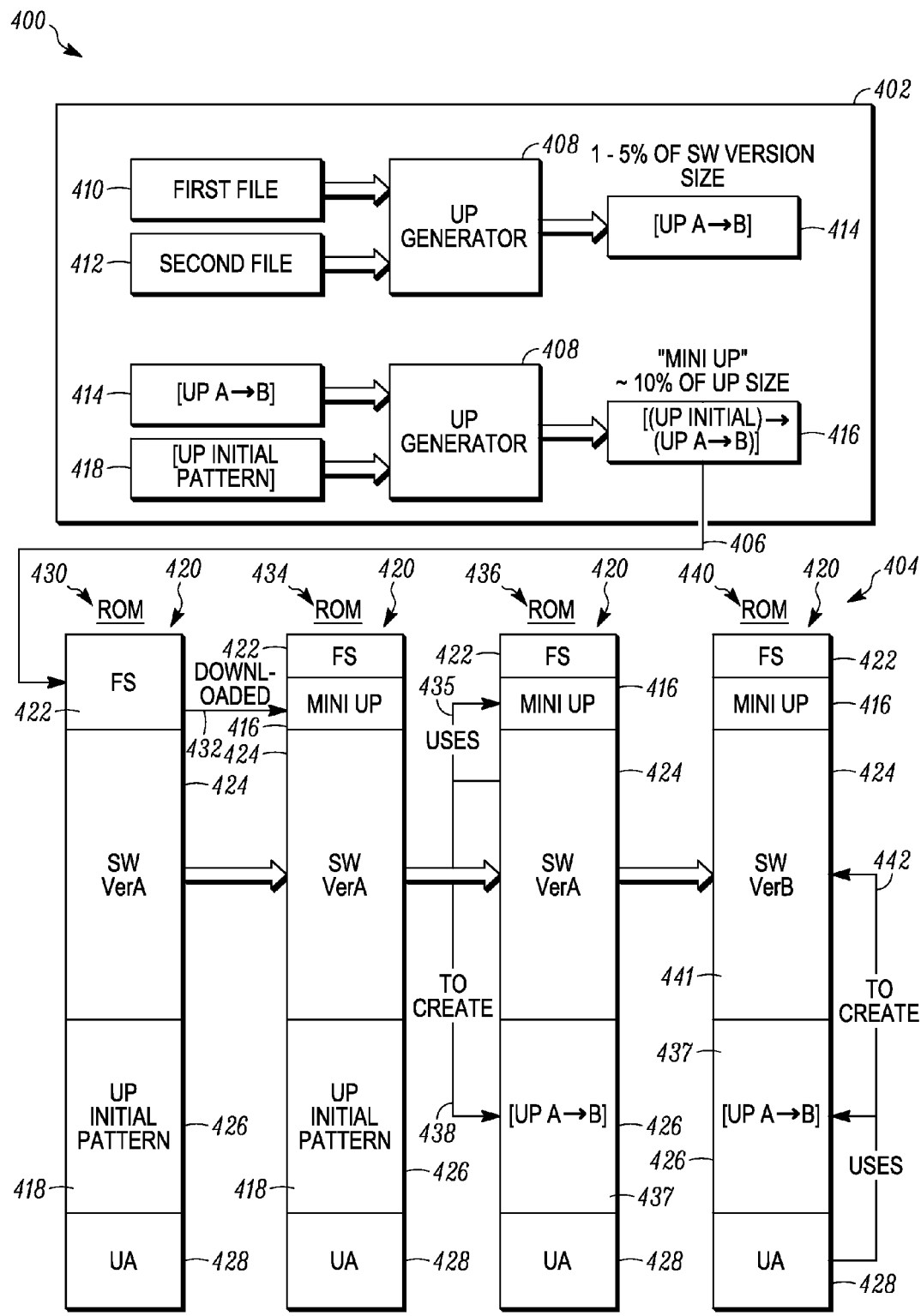
FIG. 4 a simplified schematic diagram of a software upgrade system for performing a software upgrade involving replacing a first file with a second file within a wireless communication device, as can be implemented upon the wireless communication system of FIG. 3, in accordance with at least one embodiment of the present invention.

Turning now to FIG. 4, a schematic diagram is provided that illustrates in more detail particular components of the wireless communication system 300 implemented in the base station 302 and the wireless communication device 304, which operate as a software upgrade system 400 capable of performing one or more (e.g., repeated) software upgrades, in accordance with at least some embodiments of the present invention. As shown, the software upgrade system 400 in particular includes a differencing component 402 that is implemented at the base station 302 of the wireless communication system 300, and further includes an update component 404 that is implemented at the wireless communication device 304, where the differencing component 402 and update component 404 are in communication via a communication link 406 (which can be, among other things, any of the types of communication links described above with respect to the communication link 306 of FIG. 3).

Figure 1:
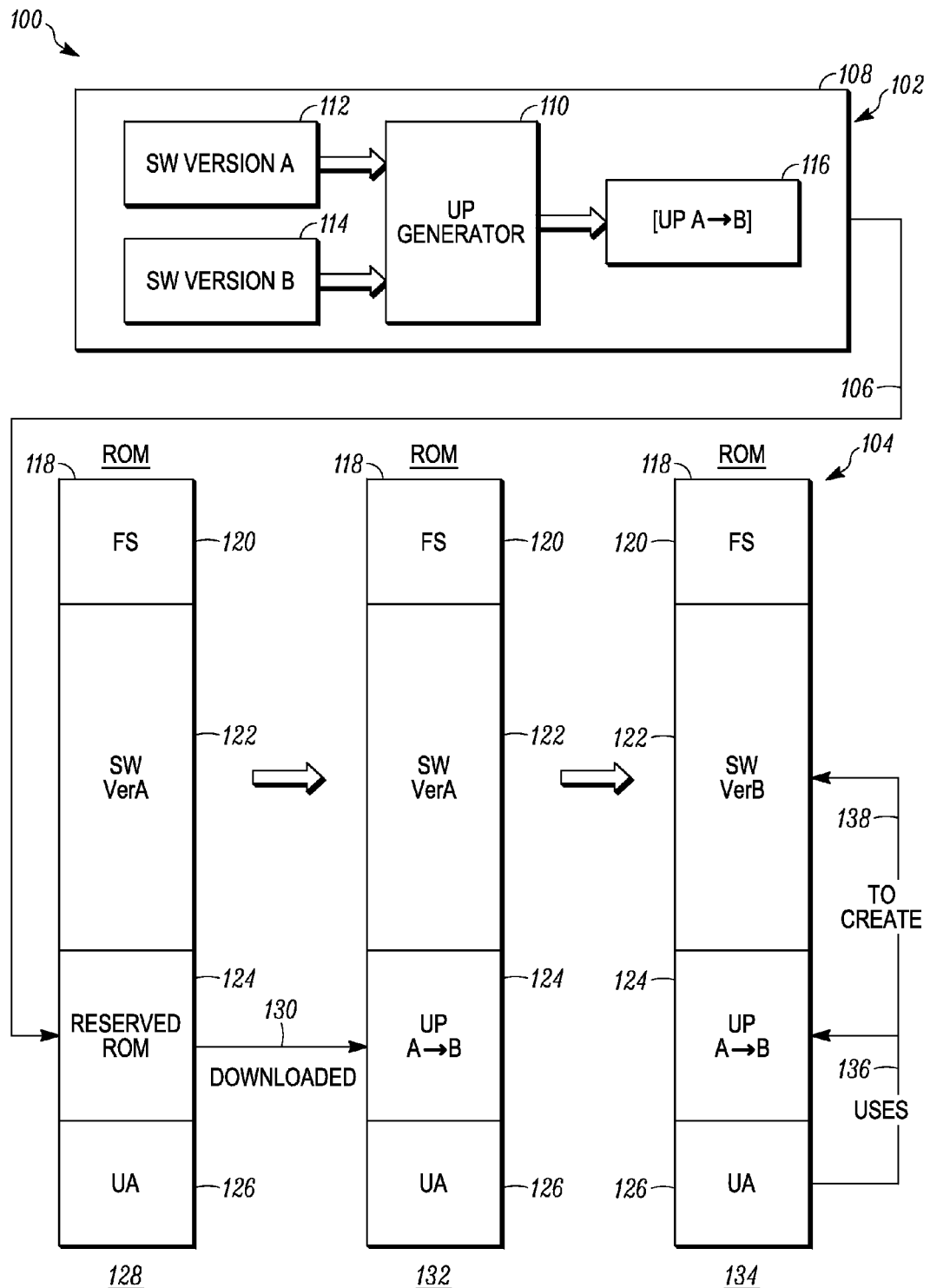
FIG. 1 (Prior Art) is a simplified schematic diagram of a software upgrade system for performing a software upgrade involving replacing a first file with a second file within a wireless communication device.

FIG. 4 in particular illustrates how the software upgrade system 400 is capable of causing upgrading of (or replacement of) a first file 410 with a second file 412 at the wireless communication device. Similar to the files 112 and 114 of FIG. 1, respectively, the first file 410 is an old or original file (e.g., Version A file), while the second file 412 is a new or revised file (e.g., Version B file) reflecting revisions to one or more software components of the first file 410 (e.g., revisions that correct one or more software bugs, update existing software features and/or add new features). Generally speaking, each of the first and second files 410 and 412, respectively, can be assumed to be a software file having a template similar to the templates of the first and the second files 112 and 114, respectively, as described above with respect to FIG. 1. Again, however, it should be understood that the files that can be upgraded in accordance with embodiments of the present invention can take any of a variety of forms, including but not limited to those mentioned above.

Figure 2A:
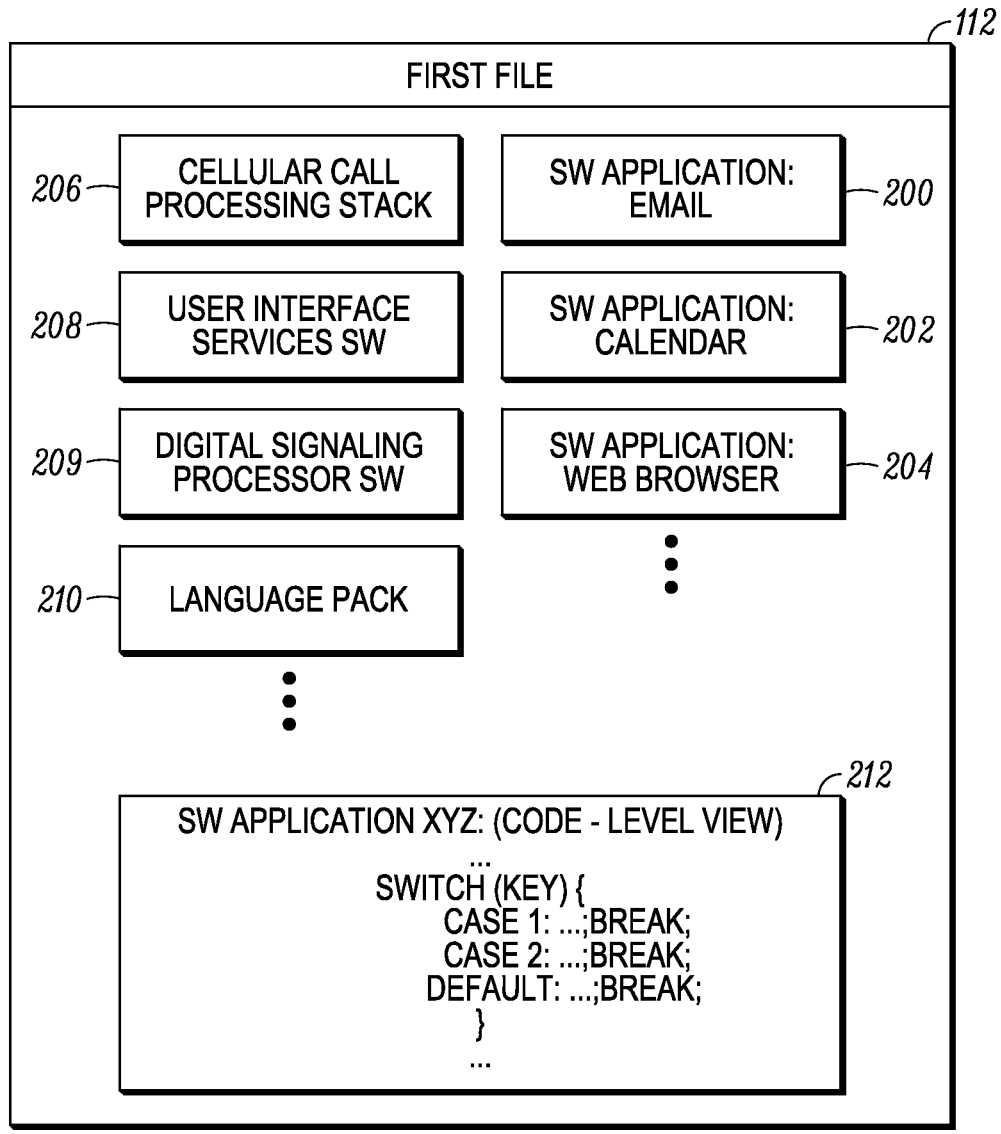
FIGS. 2A-2C (Prior Art) show in a simplified schematic form exemplary components of the software files corresponding to the first and second files of FIG. 1, as well as a third file reflecting the differences between the first and second files.
Figure 2B:
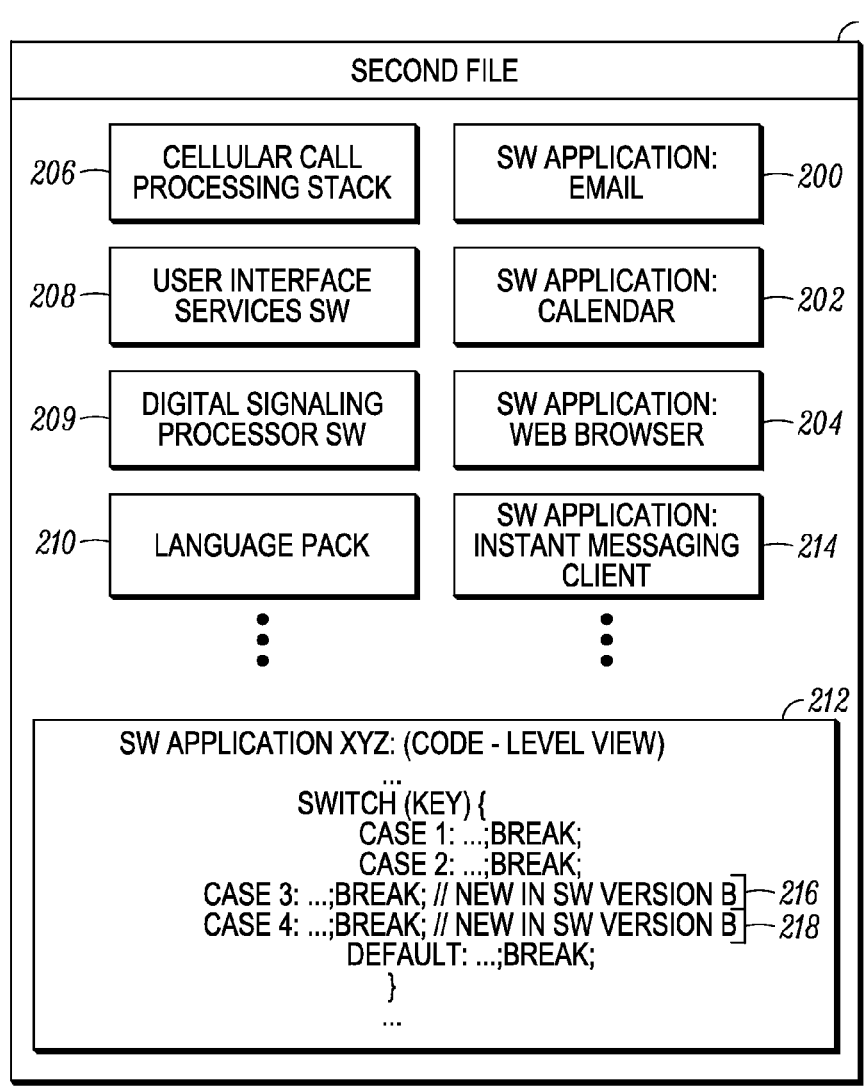
Figure 2C:
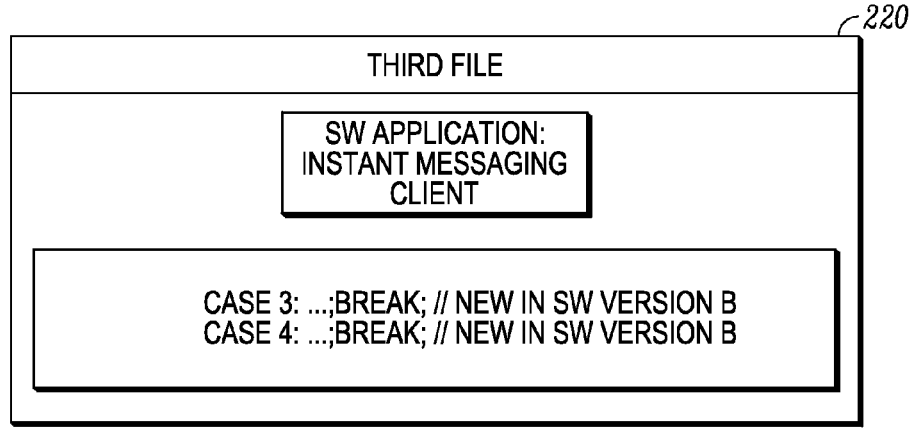

Similar to the Prior Art embodiment described above with respect to FIGS. 1-2, in accordance with the present embodiment, the differencing component 402 upon receiving the first and second files 410, 412 first determines the differences between the first file and the second file. More particularly as shown, the differences between the first and the second files 410, 412 are determined by an update package (UP) generator 408 of the differencing component 402, which utilizes a differencing software scheme (e.g., a byte differencing algorithm) to determine those differences. Upon determining the differences between the first and second files 410, 412, the UP generator 408 outputs an update file 414 reflective of those differences (which can include, for example, computer instructions and/or replacement data).

The update file 414 (represented by [UP A→B]) is generally reduced in size compared to each of the first and second files 410 and 412, respectively, for example, about 1-5% of the size of each of those files. Thus, the amount of data required to be transmitted, and corresponding time required for that data to be transmitted, during transmission of the update file 414 from the differencing component 402 of the base station 302 to the update component 404 of the wireless communication device 304 is significantly less than would be the case if the second file 412 was directly transmitted in its entirety. Nevertheless, while the first update file 414 is reduced in size compared to the first and second files 410, 412 (and particularly reduced in size relative to the second file 412, transmission of the update file 414 can still involve large amounts of data and large amounts of time.

To reduce the amount of data to be transmitted and corresponding time required for that data to be transmitted even further, at least some embodiments of the present invention further generate a second update package 416, also referred to herein as "Mini UP", which is typically only about 10% of the size of the first update file 414. To create the second update package 416, a second iteration of differencing by the UP Generator 408 is performed. Although FIG. 4 shows there to be two separate instances of the UP generator 408, one for generating the first update file 414 and another for generating the second update package 416, it will be understood that such a representation is only purposes of explanation. That is, only one instance of the UP generator 408 need be used to perform both the differencing iterations. Further, in alternate embodiments, the UP generator determining the first update file 414 based upon the differences between the first and second files 410, 412 can be separate and distinct from the UP generator that determines the second update package 416 (e.g., the two UP generators can be separate instances of the same program, application or component or even two distinct programs, applications, or components).

To determine the second update package 416, the UP generator 408 performs a second differencing operation to determine the differences between that first update file 414 and an update package (UP) initial pattern 418. Insofar as the second update package 416 is representative of differences between a given file and another file (that is, the first update file 414) that already is representative of differences between two files, the second update package 416 can be considered to include second-order difference information (by comparison, the first update file 414 includes first-order difference information). As for the UP initial pattern 418, that pattern can be considered a file that is representative of the contents of a given common, typical or otherwise expected update file. If the UP initial pattern 418 is properly chosen or determined prior to its use by the UP generator 408 in determining the second update package 416, the contents of the second update package 416 can be much reduced relative to those of the first update file 414. In at least some circumstances, the UP initial pattern 418 is a library or data set of information.

Figure 6A:
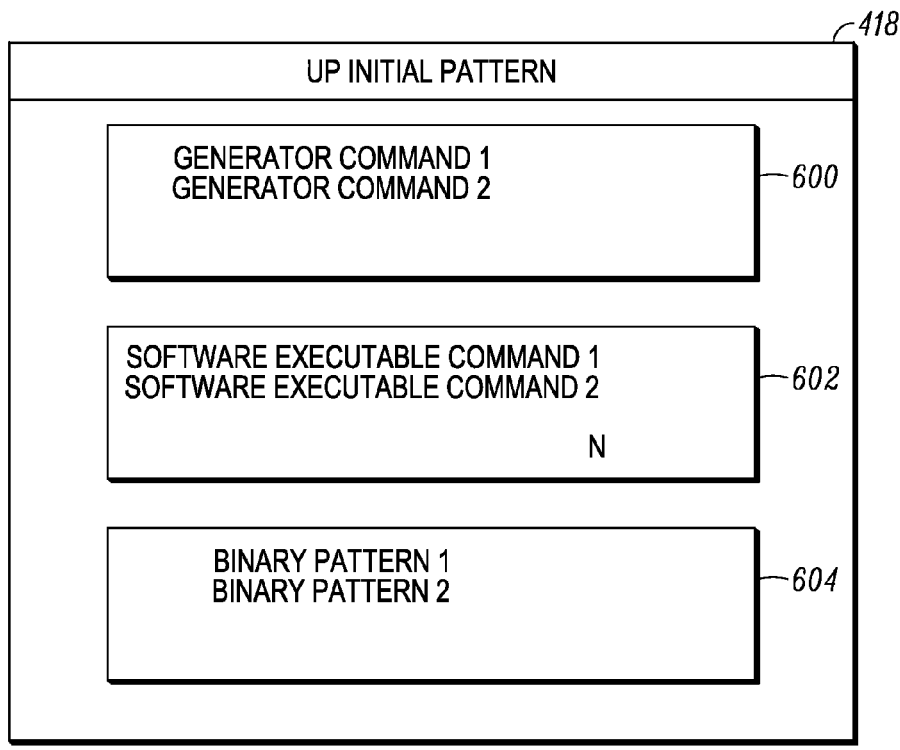
FIGS. 6A-6C show in a simplified schematic form, exemplary templates representing a second update package developed by the software upgrade system of FIG. 4, as well as the software files from which the second update package is developed.
Figure 6B:
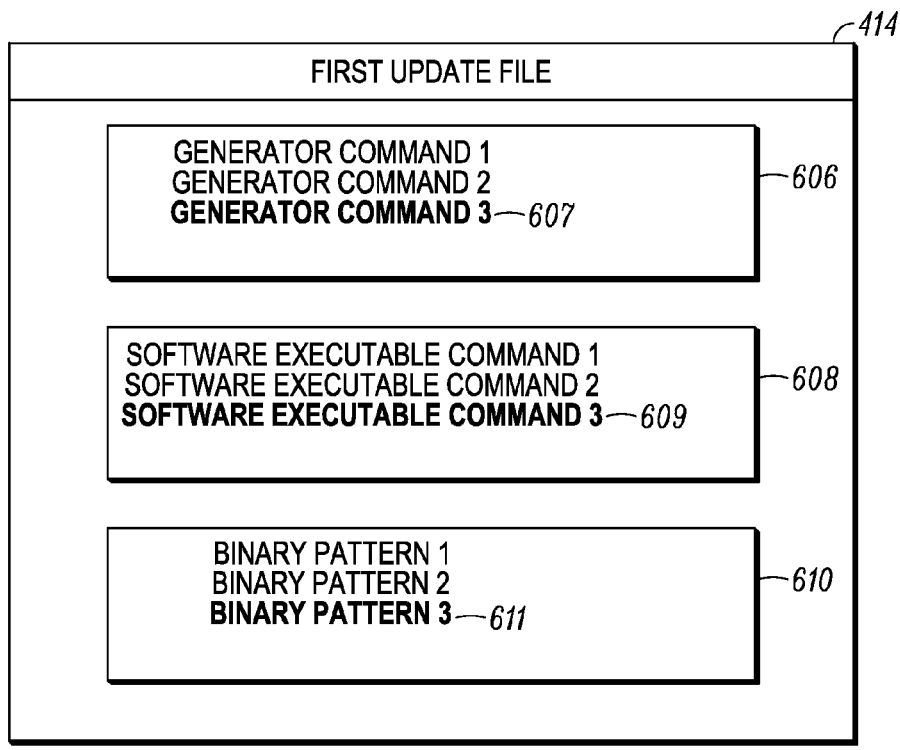
Figure 6C:
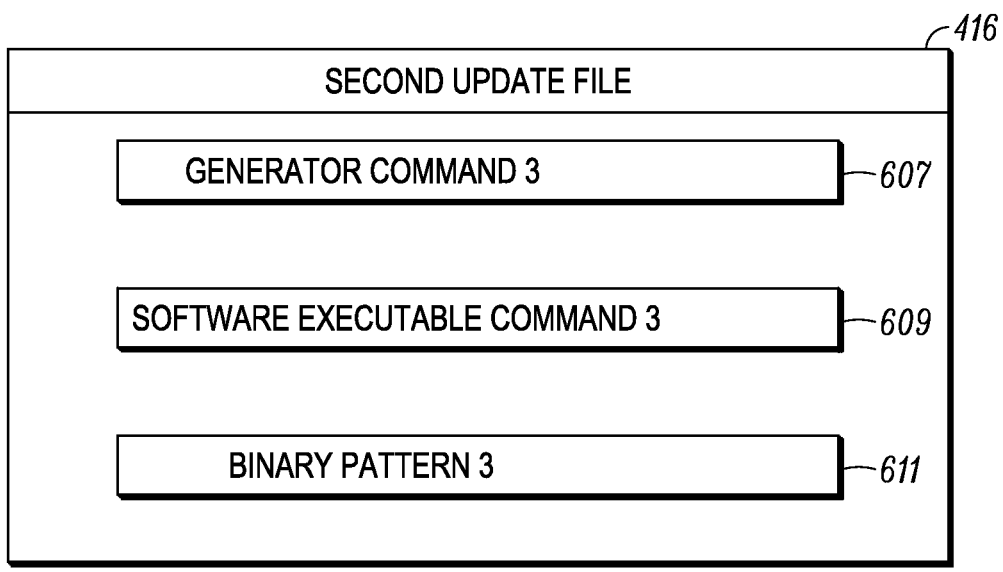

Referring additionally to FIGS. 6A-6C, respectively, examples of the UP initial pattern 418, first update file 414 and second update package 416, respectively, are provided in more detail. Although the examples provided in FIGS. 6A-6C are provided for illustration purposes, it will be understood that the contents of any given UP initial pattern or update files that are provided, utilized, transmitted, etc. can vary widely depending upon the embodiment of the invention and the particular operational circumstances and underlying files being updated. With respect to the particular exemplary UP initial pattern 418 shown in FIG. 6A, that UP initial pattern includes multiple generator commands 600, multiple software executable commands 602, and multiple software resources and applications represented in the form of binary patterns 604.

Somewhat similar to the UP initial pattern 418 of FIG. 6A, the first update file 414 of FIG. 6B also includes a plurality of generator commands 606. However, the generator commands 606 within the first update file 414 not only include the generator commands 600 found within the UP initial pattern 418, but also include an additional generator command 607 (shown in bold). In addition, the first update file 414 also includes a plurality of software executable commands 608, which not only include the plurality of software commands 602 found in the UP initial pattern 418 but also include an additional software executable command 609 (shown in bold). Further, the first update file 414 includes software resources and applications represented in binary patterns 610, which not only include the binary patterns 604 of the UP initial pattern 418 but also include an additional binary pattern 611, which is also shown in bold.

The differences between the exemplary UP initial pattern 418 and the first update file 414 are reflected within the exemplary second update package 416 of FIG. 6C, which includes the additional generator and software executable commands 607 and 609, respectively, as well as the additional binary pattern 611. Notwithstanding the fact that in the present embodiment, the first update file 414 is shown to only include additional features relative to the UP initial pattern 418, it will be understood that in other embodiments and circumstances the contents of the first update file 414 can omit one or more features found within the UP initial pattern (that is, where the first update file differs from the UP initial pattern in that some of the contents of the UP initial pattern have been deleted), or certain contents of the first update file can represent rewritten/revised version of certain corresponding contents within the UP initial pattern.

Turning back to FIG. 4, upon generating the second update package 416, the differencing component 402 then transmits that file via the communication link 406 to the update component 404. In the present embodiment, the update component 404 can be understood as encompassing a memory component 420 that is part of the memory portion 320 of the wireless communication device 304. Although it is assumed in this embodiment that part of the memory portion 320 has been employed as the update component 404 in the present embodiment, it will be understood that in other embodiments other memory components associated either directly or indirectly with the wireless communication device (e.g., one or more of the internal components 315, or another external component in communication with the wireless communication device) can be a part of the update component in conjunction with, in combination with, or instead of the memory portion 320.

Generally speaking, the update component 404 is able to operate so as to update the first file 410 with the second file 412 by virtue of the fact that the update component 404 not only has, prior to the updating process, a copy of the first file 410 stored in the memory component 420, but also has, prior to the updating process, a copy of the UP initial pattern 418 stored in that memory component as well. Because it already has both the first file 410 and the UP initial pattern 418, the update component 404 is able to entirely reconstruct the second file 412 upon receiving merely the second update package 416 from the differencing component 402. It should further be noted that, although for purposes of illustrating the upgrading process in FIG. 4 the update component 404 is primarily described as being a memory device, it will be understood that the updating process actually involves processing that is performed by the processor (e.g., the processor 318 of the wireless communication device 304) upon the information stored in the update component.

More particularly as shown in FIG. 4, the memory component 420 is divided into several regions. A first of these is a file system (FS) region 422, where various software applications such as ring-tones, wallpapers, images, video etc. of the wireless communication device 304 are stored, and where the second update package 416 generated by the UP generator 408 is also stored upon being transmitted/downloaded from the differencing component 402. In addition, the memory component 420 includes a software region 424 where a copy of the first file 410 (the file undergoing upgrading) is stored. As discussed below, the software region 424 later stores the second file 412 (that is, the upgraded file) after the upgrading process has occurred.

Further, the memory component 420 also includes a reserved memory region 426, which stores the UP initial pattern 418 and the first update package 414 at different times during the upgrading process as discussed below. Also, the memory component 420 includes an update agent (UA) region 428, which stores a software program (also referred to herein as an update agent) that facilitates the updating of the first file 410 to the second file 412 based upon the second update package 416. Although only the four memory regions 422-428 have been shown in the present embodiment, it will be understood that the number of regions within the memory component 420 can vary depending upon the embodiment.

FIG. 4 in particular shows the same update component 404/memory component 420 four times to illustrate schematically how the contents stored within the memory component evolve during an updating operation. As shown at a first step 430, the update package 416 when transmitted to the update component 404 is first received at the memory component 420 and in particular downloaded to the FS region 422 of the memory component as shown at a step 434. Subsequent to the downloading of the second update package 416, at a third step 436 a copy 437 of the first update package 414 is generated by the update component 404 based upon the second update package and the UP initial pattern 418 stored in the reserved memory region 426, as represented by an arrow 435. In the present example, this operation can be performed through the use of special software (e.g., "phone software") that is also stored (e.g., pre-loaded) within the FS region 422. The copy 437 of the first update package 414 is then stored in the reserved memory region 426 in addition to (or, in some cases, in place of) the UP initial pattern 418, as shown by an arrow 438.

After generating the copy 437 of the first update package 414 in the third step 436, at a step 440 a copy 441 of the second file 412 is then generated utilizing the copy 437 of the first update package 414 and the first file 410. In particular, the process of generating the copy 441 of the second file 412 is performed by the update agent stored within the UA region 428. As represented by an arrow 442, the update agent reads the copy 437 of the first update package 414 (and particularly the instructions and/or replacement data stored within that copy) to generate the copy 441 of the second file 412, which is then stored in the software memory region 424 in place of first file 410. Upon the performing of this step, the update process is thus complete.

Figure 5:
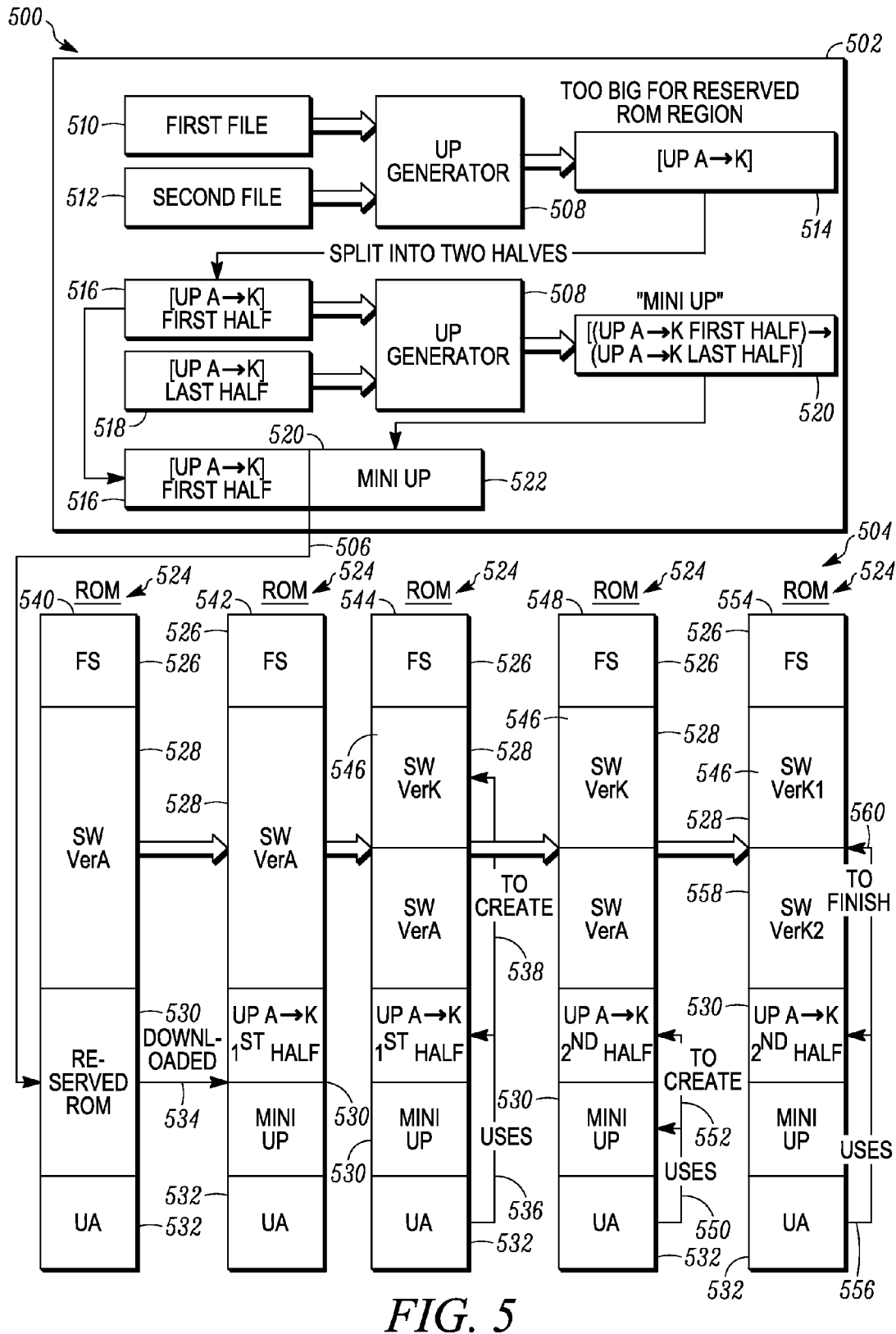
FIG. 5 a simplified schematic diagram of another software upgrade system for performing a software upgrade involving replacing a first file with a second file within a wireless communication device, as can be implemented upon the wireless communication system of FIG. 3, in accordance with at least one additional embodiment of the present invention.

Notwithstanding the discussion provided above in regards to FIG. 4, the update process can take other forms in other embodiments, and the present invention is intended to encompass such other embodiments as well. Turning to FIG. 5, one exemplary alternate embodiment of a software upgrade system 500 that can be implemented in the wireless communication system 300 in accordance with another embodiment of the present invention is shown. Similar to the software upgrade system 400, the software upgrade system 500 includes a differencing component 502 in communication with an update component 504 via a communication link 506. The upgrade component 504 in particular, like the upgrade component 404, includes a memory component 524 having each of a FS region 526, a software region 528, a reserved memory region 530 and a UA region 532.

However, the software upgrade system 500 also includes certain features and performs certain operations that are different than those of the software upgrade system 400. Typically, the reserved memory region of the update component 504 is of a fixed, budgeted size such that it is not possible for every update package of any arbitrary size to be stored within the memory region. Yet in many cases update packages (such as the update package 416) can become quite large and, in a case where the update package exceeds the size of the reserved memory region, a software upgrade system such as the system 400 shown in FIG. 4 will be unable to download and store the appropriate update package and consequently unable to perform the upgrading process. In view of these considerations, the differencing component 502 of the software upgrade system 500 performs certain additional steps so as to reduce the overall contents of the upgrade package that is to be downloaded to the upgrade component 504.

As shown in FIG. 5, the differencing component 502 like the differencing component 402 includes an update generator (or UP generator) 508 that generates a first update file 514 (represented as [UP A→K]) based upon an original/old (e.g., Version A) first file 510 and a new/revised (e.g., Version K) second file 512 (through the use of a differencing scheme or otherwise). However, rather than transmitting the first update file 514 to the upgrade component 504 (particularly if that upgrade file is too large for the reserved memory region 530), that first update file instead is split by the differencing component 502 into first and second halves 516 and 518, respectively, which can be equally-sized (or unequally-sized) portions of the first update file 514. The first and second halves 516, 518 are then input again into the UP generator 508, which in turn generates a second update file or "Mini UP" 520 representing the differences between those first and second halves.

Upon the generation of the second update file 520, that file is then combined with the first half 516 to form a third update file 522, which is then transmitted from the differencing component 502 to the upgrade component 504. It should be noted that, insofar as the second update file 520 is representative of differences between two files (that is, the halves 516 and 518), each of which is representative of differences between two other files (that is, differences between respective portions of the first and second files 510, 512), the second update package 416 can be considered to include second-order difference information. By comparison, the first half 516 of the first update file 514 includes first-order difference information, and thus the third update file 522 can be understood as including both first-order and second-order difference information.

Similar to the illustration provided by FIG. 4, FIG. 5 in particular shows the same update component 504/memory component 524 five times to illustrate schematically how the contents stored within the memory component 524 evolve during an updating operation based upon the third update file 522. As shown, the third update file 522 upon being received at the update component 504 at a step 540 is first downloaded to the reserved memory region 530 (as indicated by an arrow 534) at a step 542. After this downloading, in a third step 544, the update agent implemented within the UA region 532 utilizes the first half 516 and the second update file 520 of the third update file 522, as indicated by an arrow 536, to reconstruct a copy 546 of a portion (e.g., the first half) of the second file 512, as indicated by arrow 538. The copy 546 is stored within the software region 528 of the memory component 524, along with the copy of the first file 510 that is already present in that software region.

Subsequent to the creation of the copy 546 of the portion of the second file 512, the update agent in a fourth step 548 utilizes the second update file 522 (as illustrated by an arrow 550), which is also stored as part of the third update file 522 in the reserved memory region 530, to generate a copy of the second half 518 of the first update file 514. The copy of the second half 518 of the first update file 514 upon being generated is stored in the reserved memory region 530 as shown by arrow 552 and, in some cases, can replace the first half 516 of the first update file 514 previously stored within that memory region. Next, at a fifth step 554, the update agent utilizes the copy of the second half 518, as shown by an arrow 556, to reconstruct a copy 558 of the remaining portion (e.g., the second half) of the second file 512, as shown by an arrow 560. Upon reconstruction, the copies 546 and 558 together constitute a copy of the entire second file 512, which then entirely replaces the copy of the first file 510 within the software region 528.

Although the embodiments of the present invention shown in FIGS. 3-6C are intended to be illustrative of certain exemplary embodiments of the present invention, it should be understood that the present invention is also intended to encompass a variety of other embodiments as well. By comparison with conventional software upgrade systems such as that discussed with reference to FIGS. 1-2C, it should be evident that the embodiments of FIGS. 3-6C offer enhanced performance during software upgrades insofar as the amount of information that is transmitted between the base station and the wireless communication device, and thus the amount of time required for such transmission, can be significantly reduced. Not only can this result in enhanced effective network capacity (and better use of existing bandwidth), which can translate to an improved user experience, but also often the software upgrade process can be performed in the background without disrupting normal usage of the device. Indeed, in some cases embodiments of the present invention allow for software upgrades where previously (e.g., due to memory limitations) such upgrades might not have been feasible.

More particularly, the software upgrade systems described with respect to FIGS. 3-6C achieve enhanced performance in software upgrading in that these software upgrade systems operate not by transmitting simply the differences between a given old software file and an upgraded version of that software file, but instead by transmitting at least some information that represents certain second-order differences between such differences and other assumed or otherwise-discernable standard differences. This second-order difference information tends to be of much lesser size and consequently, by virtue of undergoing a double iteration of differencing, the update packages that are developed and transmitted are significantly smaller than the update packages transmitted in conventional software upgrade systems.

Notwithstanding the embodiments of the software upgrade systems described above with respect to FIGS. 1-6C, various refinements as well as additions to the features above, is contemplated and encompassed within the invention. For example, although only certain components of the wireless communication device have been described above, various additional components commonly associated with such devices can be present. Further, the invention can be utilized with any of a variety of wireless communication devices including, for example, mobile device, personal digital assistants, etc. The particular characteristics (e.g., the number and arrangement of memory regions) of the memory components 404, 524 can vary depending upon the embodiment as well.

Also, in at least some embodiments, additional operational methodologies instead of or in addition to those discussed particularly above can be utilized. For example, in yet another exemplary embodiment, the first half 516 of the first update file 514 generated by the differencing component 502 in the embodiment of FIG. 5 can be further compared with an UP initial pattern similar to the pattern 418 of FIG. 4, and the resulting differencing information can be transmitted (along with the second update file 520) as a combination third update file. That is, in such embodiment, the third update file would not include both the second update file 520 and the first half 516 of the first update file 514, but rather would include the second update file 520 and another file similar to the second update package 416 of FIG. 4 (in such embodiment, UP initial pattern information would presumably also be provided at the upgrade component).

It is specifically intended that the present invention not be limited to the embodiments and illustrations contained herein, but include modified forms of those embodiments including portions of the embodiments and combinations of elements of different embodiments as come within the scope of the following claims.

I claim:

1. A method of upgrading a first software file stored at a wireless communication device so that the wireless communication device is provided with a second software file that is an upgraded version of the first software file, the method comprising:

Receiving, via a wireless communication link, a software upgrade file, wherein the software upgrade file includes second-order difference information;

storing the received software upgrade file in a first memory portion of at least one memory component associated with the wireless communication device; and generating the second software file based upon the received software upgrade file, the first software file, and an additional file, wherein the additional file includes at least one of a pattern file representative of assumed differences between the first and second software files and a further file including at least some first-order difference information representative of at least some actual differences between the first and second software files;

wherein the second-order difference information of the software upgrade file is representative of further differences between the additional file and a further first-order difference information file;

wherein the additional file is received via the wireless communication link in combination with the software upgrade file;

wherein the additional file includes the further file, wherein the at least some first-order difference information is substantially a first half of an overall first-order difference file representative of all of a plurality of first order differences between the first software file and the second software file, the plurality of the first order differences including the at least some actual differences, wherein the further first-order difference information file is substantially a second half of the overall first-order difference file, and wherein the further differences are between the first half of the overall first-order difference file and the second half of the overall first-order difference file.

2. The method of claim 1, wherein the additional file includes the pattern file and the pattern file is also stored at the wireless communication device prior to the receiving of the software upgrade file.

3. The method of claim 2, wherein the further first-order difference information file includes an update package file constituting a complete representation of all of the differences between the first and second software files, and wherein the update package file is generated based upon the pattern file and the received software upgrade file by the wireless communication device.

4. The method of claim 3, wherein the second software file is generated by the wireless communication device based upon the update package file and the first software file, and wherein each of the update package file and the pattern file includes respective portions of generator command information, software executable command information, and binary pattern information representative of software resource or application information.

5. The method of claim 4, wherein the second software file is stored in a segment of a memory component of the wireless communication device that also, at least previously, stored the first software file.

6. The method of claim 3, wherein the update package file is stored in a segment of a memory component of the wireless communication device that also, at least previously, stored the pattern file.

7. The method of claim 1, wherein the generating is performed at least in part by a processing device of the wireless communication device interacting with the first memory portion, and further comprising determining the software upgrade file including the second-order difference information at a base station prior to transmission of the software upgrade file to the wireless communication device.

8. The method of claim 7, wherein the determining includes first determining the first-order difference information and then subsequently determining the second-order difference information, and wherein the method is repeated in relation to additional, subsequent software upgrades in relation to one or more of the first software file, the second software file and other software files.

9. The method of claim 7, wherein the wireless communication device is at least one of a cellular telephone, a personal digital assistant, a hand-held device and a mobile device, and wherein the base station includes a server computer.

10. A wireless communication device configured to allow for upgrading of a first software file stored thereon with a second software file that is an upgraded version of the first software file, the device comprising:
 a wireless receiver;
 a processor in communication with the wireless receiver; and
 a memory in communication with the processor, wherein the memory includes at least first, second and third memory regions;
 wherein the first memory region is configured to store the first software file, wherein the second memory region is configured to store a software upgrade file received wirelessly via the wireless receiver;
 wherein the software upgrade file includes second-order difference information that is representative of one or more second differences between a first difference file and an additional file, the first difference file comprising at least some first-order difference information representative of at least some actual differences between the first and second software files; and
 wherein the third memory region is configured to store the additional file, the additional file including at least one of a pattern file representative of assumed differences between the first and second software files and a further file comprising at least some additional first-order difference information representative of at least some additional actual differences between the first and second software files,
 wherein the processor operating in conjunction with the memory is configured to reconstruct the second software file based upon the first software file, the software upgrade file, and the additional file;
 wherein the additional file includes the further file, wherein the at least some additional first-order difference information is substantially a first half of an overall first-order difference file representative of all of a plurality of first order differences between the first software file and the second software file, the plurality of the first order differences including the at least some additional actual differences, wherein the first difference file is substantially a second half of the overall first-order difference file, and wherein the one or more second differences are between the first half of the overall first-order difference file and the second half of the overall first-order difference file.

11. The wireless communication device of claim 10, wherein the device is at least one of a cellular telephone, a personal digital assistant, a hand-held device and a mobile device.

12. The wireless communication device of claim 11, wherein the additional file includes the pattern file, and wherein both the first software file and the pattern file are stored in the memory prior to the receiving of the software upgrade file.

13. The wireless communication device of claim 11, wherein the further file is received by the wireless communication device along with the software upgrade file.

14. The wireless communication device of claim 11, further comprising an update agent capable of assisting in the reconstructing of the second software file.

15. The wireless communication device of claim 11, wherein the memory stores at least some information in a read-only memory (ROM) region.

16. A wireless communications system configured to allow for upgrading of a first software file with a second software file that is an upgraded version of the first software file achieving software upgrades, the system comprising:
 a base station including a differencing component that generates a software upgrade file including second-order difference information representative of differences between first and second intermediate files, wherein at least one of the intermediate files includes first-order difference information representative of differences between the first and second software files; and
 a mobile device in wireless communication with the base station via a wireless communication link, the mobile device including a processor and an upgrade component including at least a part of a memory of the mobile device, wherein the update component that receives the software upgrade file transmitted wirelessly from the base station and generates the second software file based upon the received software upgrade file, the first software file, and an additional file, wherein the additional file is the first intermediate file and either:
 the additional file includes a pattern file representative of assumed differences between the first and second software files and the second intermediate file includes the first-order difference information;
 or the additional file includes a first portion of the first-order difference information and the second intermediate file includes a second portion of the first-order difference information; and
 wherein the additional file includes the first portion of the first-order difference information, wherein the first portion of the first-order difference information is substantially a first half of an overall first-order difference file representative of the differences between the first and second software files, wherein the second intermediate file including the second portion of the first-order difference information is substantially a second half of the overall first-order difference file, and wherein the differences between the first and second intermediate files are differences between the first half of the overall first-order difference file and the second half of the overall first-order difference file.

17. The wireless communication system of claim 16, wherein the mobile device is at least one of a cellular telephone, a personal digital assistant, and a hand-held device, and wherein the mobile device further includes an update agent capable of assisting in the reconstructing of the second software file.

18. The wireless communication system of claim 16, wherein each of the base station and the mobile device includes means for processing, and wherein the mobile device further includes means for storing information including at least the first software file and the received software upgrade file.

* * * * *